Patented Feb. 14, 1939

2,146,892

UNITED STATES PATENT OFFICE 2,146,892

PROCESS OF PRODUCING BUTYL ALCOHOL AND ACETONE BY FERMENTATION

Alfred Frey, Freising, and Hans Glück, Munich, Germany

No Drawing. Application April 21, 1937, Serial No. 138,186. In Germany March 16, 1936

3 Claims. (Cl. 195—46)

The bacterial cultures used in the process of producing butanol and acetone generally pass through a definite cycle of development, during which they convert carbohydrates into butyric acid and acetic acid, and then reduce these to butanol and acetone, the reduction being in part immediate.

When these cultures, which include Clostridium acetobutylicum and various morphologically similar butanol formers, are further developed it has been noted, e. g., by Bernauer (Biochemische Zeitschrift, Nr. 280, page 383; 1935) that there are signs of degeneration, including reduced resistance to acid and reduced de-oxidizing power. In the course of normal fermentation, with formation of Clostridia and spores, there is a reduction of acid with abundant production of butanol, whereas with a degenerated culture there is a continuous increase of acid, without appearance of Clostridia and spores, and the breaking down of the sugar ultimately stops and cannot be re-started by neutralizing the acid with lye or lime, though the contrary was held by F. B. Fred, W. H. Petersen and M. Mulvania (Journ. Bact. No. 11, page 323).

The following table briefly indicates the course of two butanol fermentations, with cultures at the same stage of development in the same medium (potato mash 6° Bllg.):

| Normal fermentation— | | Defective fermentation— | |
|---|---|---|---|
| Time (hours) | Acid ccm. n/1 NaOH/20 cc. mash filtrate | Time (hours) | Acid ccm. n/1 NaOH/20 cc. mash filtrate |
| 0 | 0.19 | 0 | 0.22 |
| 6 | 0.38 | 4 | 0.26 |
| 12 | 0.83 | 8 | 0.28 |
| 24 | 0.97 | 12 | 0.7 |
| 29 | 0.84 | 16 | 0.88 |
| 48 | 0.49 | 20 | 1.04 |
| 72 | 0.49 | 24 | 1.48 |
| | | 96 | 3.34 |

The content of solvents such as butanol, acetone and ethyl alcohol was 2.56 vol. % in the case of the normal fermentation, and 0.64 vol. % in the case of the other.

Similar signs of degeneration can also be observed in large scale operations, where they may become apparent to the naked eye, as for instance through failure to form a film. A. M. Wynne (Journ. Bact. No. 22, page 237) noted that on addition of butyric and acetic acid to produce a pH value of from 3.65 to 3.75 there was complete stoppage of butanol-acetone fermentation.

Degeneration is to be observed when laboratory cultures are bred under aerobic or anaerobic conditions, with or without change of medium. It occurs also in the case of cultures which appear to be normal but are weakened by breeding and are then transferred to a larger quantity of mash.

There have been several proposals for preventing this occurrence and the consequent loss. It has for instance been proposed to pre-heat the mash so as to destroy vegetable organisms therein, and it was stated that where this is done and a particular bacterium is used (Bacillus butylicus Boinot-Firmin) there was no failure of fermentation, even after prolonged breeding.

It is a common practice in bacteriology to heat mixtures of bacteria, so as to separate heat resistant spores from less resistant spores. This has been done in order to procure and develop more efficient breeds. Definite precautions are, however, necessary. Heating butyl bacteria to 100° C. weakens the culture.

A proposal not hitherto published is that of heating the cultures in an alkaline culture medium, for the purpose of preventing degeneration.

We have found that for preventing defective fermentation with a high degree of reliability it is necessary to carry out the proposed treatments in a particular sequence and a particular manner. Neither heating alone, nor transfer to an alkaline medium, is in itself sufficient to ensure a thoroughly sound culture. We have found, in particular, that it is not correct to effect the elimination of vegetable forms, by heating, in the alkaline medium. It should be done in an interposed normal stage. In the alkaline medium the spores are too sensitive to heat, so that in addition to killing the vegetable forms the heat weakens the spores. As regards adding lime, this must be so carried out that there is an alkaline reaction during the whole period of development.

The process has the advantage of simplicity, enabling cultures to be bred in the laboratory, which can subsequently be used for large scale work and transferred from mash to mash with retention of good fermenting properties. The heating is neither so long as to weaken the cultures, nor does it take place in an alkaline medium conducive to weakening.

Example I

From 5 to 10 ccm. of a culture of Clostridium acetobutylicum are sealed in a tube with 15 ccm. of a 6° Balling potato mash, the sealing being effected with paraffin wax softening at from 60 to 65° C. The tube is heated for two minutes in boiling water. We have found two minutes to be the optimum heating period. Then the tube is quickly cooled and well shaken, and is kept for two days at a temperature of 37.5° C. After 48 hours, following this treatment, the culture is found still to consist mainly of short rods. A transfer is then made to a second tube, where 0.25 gr. $CaCO_3$ are added, keeping the pH value above 7.1 throughout a period of 48 hours, when the whole culture will consist of long and short rods. Then another transfer is made to a tube without addition of lime, but with heating, and after 48 hours the appearance of Clostridia is observed. This alternation from normal culture to lime-treated culture may be repeated three or four times with increased appearance of Clostridia and spores after 48 hours. We have found that with a culture thus developed the twenty-third generation still produced normal fermentation, carried out as follows:

5 litres of 6° Balling mash were treated with the culture of *Clostridium acetobutylicum* in the twenty-fourth stage of generation, and were kept 72 hours at 37.5° C. The following table shows the result:

| | Before fermentation | After fermentation |
|---|---|---|
| Concentration (degrees Balling) | 6 | 1.25 |
| Acidity of mash (in ccm. n/1 NaOH/20 ccm.) | 0.10 | 0.36 |
| pH | 5.92 | 4.75 |
| Solvents in fermented mash ........ volume, per cent. | | 2.05 |

Example II

The same quantity and kind of mash was treated with a culture developed with only seven transfers from normal tubes to tubes with alkaline medium, and the mash was kept for 72 hours at 37.5° C:

| | Before fermentation | After fermentation |
|---|---|---|
| Concentration (degrees Balling) | 6 | 2.9 |
| Acidity of mash | .20 | 1.4 |
| pH | 6.11 | 3.8 |
| Solvents ........ volume, per cent. | | 0.64 |

The process is not only adapted to prevent degeneration of the cultures, but also to restore degenerated cultures to normal efficiency for fermentation.

Example III

A receptacle of fermentation with a content of 20 litres of potato mash is ingrafted with 500 ccm. of a first ferment, made according the Examples I and II. After finish of the main fermentation phase, ⅕ of this mash (4 litres) is given in 16 litres of a fresh mash. This is repeated 4–5 times in succession. The remaining mashes are normal fermentated through after 72 hours total fermentation time and give the following results:

2nd phase 2.55 vol. % butanol-acetone
3rd phase 2.01 vol. % butanol-acetone
Medium of the 5 phases 2.60 vol. %.

This form of the transfer at the moment of the beginning formation of Clostridia has opposite to others described continuous processes of fermentation the advantage that the bacteria can acomplish their natural cycle of acretion and a certain reduction of the nascent butyric acid into butanol.

What we claim is:
1. The herein described process of producing butyl alcohol and acetone by fermentation, which process comprises the steps of heating cultures of butanol forming bacteria in a normal culture medium to the boiling temperature of water, transferring said cultures from said normal medium to an alkaline medium with a pH value kept above 7.1 by addition of alkali, the bacteria being bred in said alkaline medium at normal aeration temperature of about 37.5° C., repeating the heat treatment in the normal medium and the breeding step in the alkaline medium, and inoculating a mash with bacteria bred in this manner.

2. The herein described process of producing butyl alcohol and acetone by fermentation, which process comprises the steps of subjecting cultures of butanol forming bacteria, in a normal culture medium for two minutes to a heat treatment in boiling water, transferring said cultures from said normal medium to an alkaline medium with a pH value kept above 7.1 by addition of alkali, the bacteria being bred in said alkaline medium at normal aeration temperature of about 37.5° C., repeating the heat treatment in the normal medium and the breeding step in the alkaline medium, and inoculating a mash with bacteria bred in this manner.

3. The herein described process of producing butyl alcohol and acetone by fermentation, which process comprises the steps of heating cultures of butanol forming bacteria in a normal culture medium to the boiling temperature of water, transferring said cultures from said normal medium to an alkaline medium with a pH value kept above 7.1 by addition of alkali, the bacteria being bred in said alkaline medium at normal aeration temperature of about 37.5° C., repeating the heat treatment in the normal medium and the breeding step in the alkaline medium, inoculating a quantity of mash with bacteria bred in this manner, fermenting said mash until the vegetative generation of bacteria ceases, transferring a fraction of the fermented mash to a quantity of fresh mash supplementing said fraction to the initial quantity, fermenting said fresh mash and repeating several times the transfer of a fraction of fermented mash to a quantity of fresh mash and the fermentation of the latter.

ALFRED FREY.
HANS GLÜCK.